Jan. 24, 1967    O. WIEGEL    3,299,517
REFERENCE GAUGE ACCESSORY
Filed Nov. 22, 1963
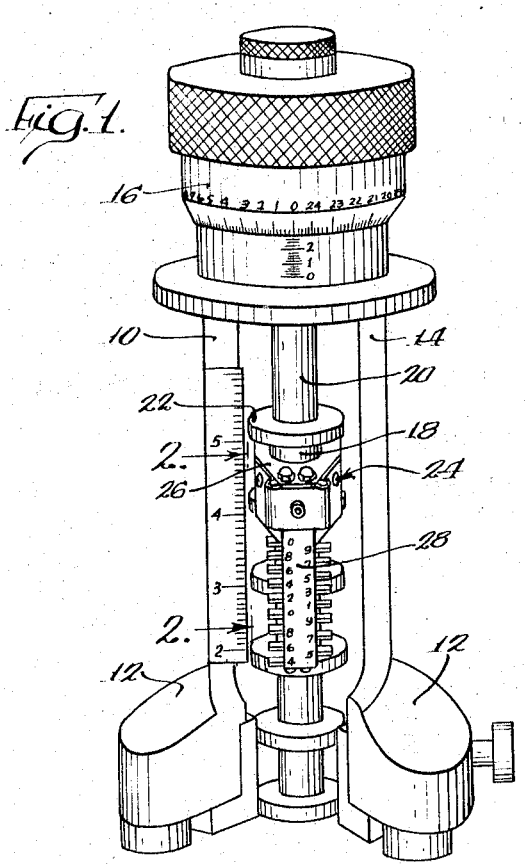
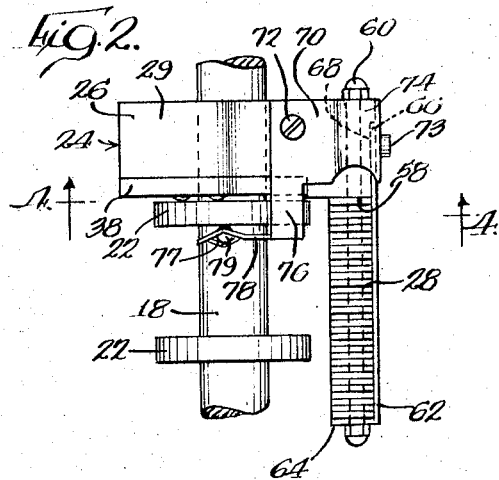
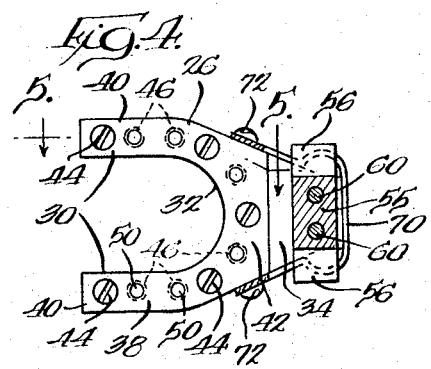
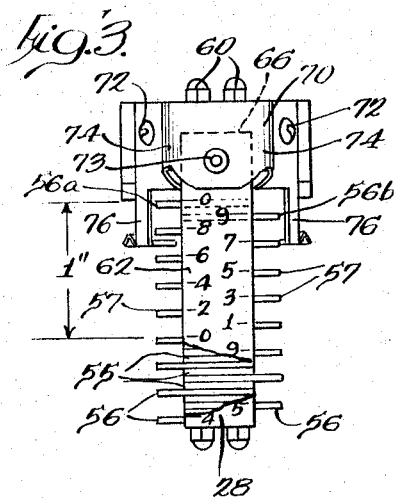
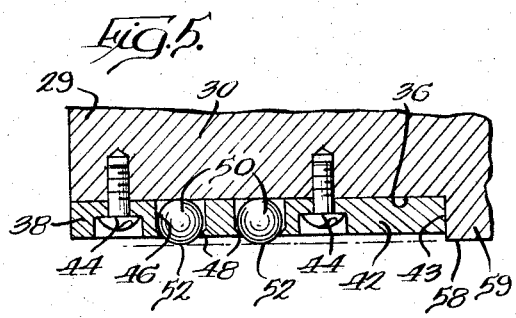
INVENTOR.
Otto Wiegel
BY
Gradolph, Love & Rogers
Attys

United States Patent Office 3,299,517
Patented Jan. 24, 1967

3,299,517
REFERENCE GAUGE ACCESSORY
Otto Wiegel, Chicago, Ill.
(3541 Martens St., Franklin Park, Ill. 60131)
Filed Nov. 22, 1963, Ser. No. 325,696
3 Claims. (Cl. 33—170)

My invention relates to a reference gauge accessory and more specifically to an accessory adapted to be used in conjunction with a well known reference height gauge for minimizing the time necessary to set the gauge to any desired height.

The reference height gauge in conjunction with which my invention is to be used is one manufactured by the Cadillac Gauge Company of Detroit, Michigan. Such gauges provide horizontal reference surfaces at one inch intervals on a shaft which is movable up and down by a micrometer.

In measuring or checking out a machined piece of whatever character, the specified dimension is set on the reference gauge by moving the micrometer to the desired fractional inch setting and then selecting the reference surface appropriate to the whole inch portion of the desired measurement. For instance the lowermost reference surface (which will be less than an inch distance from the next higher reference surface because of the necessary thickness of the material providing the surface) will be used for laying out heights from the thickness of the reference member up to an inch. The surface next above will carry the measurement from one to two inches, etc. Assuming a height of 1.1000 inches to be scaled, the micrometer will be set to .1000 inch and the dial indicator then read against the second reference surface from the bottom. Assuming the next height to be checked is 2.9000 inches, the micrometer will be turned through 32 full revolutions to .9000 inch and the dial indicator then applied to the third reference surface from the bottom. It is conventional that micrometers have forty threads to the inch, and therefore it takes 40 revolutions thereof to move the micrometer from one extreme to the other of its scale. Moving the micrometer through its full range forty revolutions is laborious and time consuming. Of course, no successive adjustment of the gauge will require a full forty revolutions, but on the average, consecutive adjustments would require twenty revolutions.

Applicant's invention is directed to an attachment for the above described gauge whereby a full range of scale adjustment can be provided by less than four revolutions. If applicant's device is to be compared to the basic gauge, the average of the adjustments would work out to two revolutions. A user of the basic gauge will spin it casually to a point near the desired setting and then carefully turn to the exact point. Applicant's whole adjustment lies within the range of the fine adjustment of the basic gauge.

Applicant provides this increased convenience in the form of an accessory which is simple and inexpensive and yet which functions with certainty. Applicant's device derives its accuracy from the reference surfaces of the basic gauge. The effect of applicant's device is to subdivide the space between adjacent reference surfaces of the basic gauge into many reference levels.

It might be expected that such a subdivision of the space between reference levels might lead to an awkward closeness of reference surfaces. However, the device of my invention is notable for convenient arrangement of reference surfaces whereby, even at 0.1 inch spacing, accessibility is convenient and easy.

In the basic gauge, only top reference surfaces are provided. The under parts of the members which provide the reference surfaces are not formed to accuracy. Applicant's device provides for under reference surfaces as well as top reference surfaces and provides the same accuracy of surface and ease of dial indicator setting for them as for the top reference surfaces.

Other objects and advantages of my invention will be apparent from the following description and drawings of which:

FIG. 1 is a front perspective view of a reference height gauge or a surface plate inspection gauge as described above equipped with the accessory of my invention;

FIG. 2 is an enlarged side elevation of my device as mounted on the bar of the gauge of FIG. 1 taken substantially from the line 2—2 of FIG. 1 looking in the direction of the arrows;

FIG. 3 is a front elevation of my accessory;

FIG. 4 is a bottom plan view taken substantially from the line 4—4 of FIG. 2 looking in the direction of the arrows; and FIG. 5 is a section taken along the line 5—5 of FIG. 4 looking in the direction of the arrows.

FIG. 1 shows a gauge 10 of the Cadillac type having a base 12, a column 14, a micrometer head 16 mounted to the top of the column and a bar 18 secured to the micrometer spindle 20. The column 14 is concave to enclose the bar 18 partially. The bar has a plurality of flanges or rings 22 extending outwardly therefrom having accurately machined top surfaces, the rings being formed to provide consecutive top surfaces an even inch apart. The operation of this gauge will be evident from the description before.

The accessory 24 of my invention consists of a horizontal U-shaped fork portion 26 and a tongue or scale portion 28 extending downwardly from the base of the fork portion. The fork portion 26 includes a U-shaped block 29 having a pair of parallel arms 30 with a notch 32 between, proportioned to encompass closely but freely the bar 18 of the gauge 10. The sides of the fork portion converge as at 34 toward its front face.

The tongue extends downwardly from the fork portion at exactly a right angle, and the under side 36 of the fork portion is formed to be true to this right angle or in other words be the reference surface with respect to which the right angle is determined.

The fork portion also includes a U-shaped bearing retainer plate 38 which conforms in plan to the rearward portion of the forked part 26 of the accessory; that is, it includes arms 40 following the line of the block arms 30 and an interconnecting forward segment 42 which butts up against a shoulder 43 on the block 29. The bearing retainer plate is secured to the under side of the block by countersunk screws 44. The retainer plate has a plurality of upwardly opening bearing pockets 46 formed therein which are inwardly flanged as at 48 about their lower ends. As illustrated, there are six such pockets (FIG. 4). Ball bearings 50 are contained in these pockets, being confined between the bottom surface 36 of the block 29 and the inwardly flanged lower ends 48 of the pockets 46 so that the lower edges 52 of the balls protrude out of the pockets.

The tongue portion 28 consists of a stack of plates having accurately ground top and bottom surfaces and, here, an accurate thickness of .05 inch. Alternate plates 55 are short; the other plates 56 are long. The long plates are stacked, so that their ends 57 extend alternately to the left and to the right of the stack edges as defined by the short plates 55.

The stack of plates is secured against an accurately ground surface 58 on a boss 59 on the under side of the front or base of the block 29. To this end, holes are bored through the plates 55 and 56 and the block for the reception of bolts 60.

An L-shaped face plate 62 is mounted to the front of the stack to reinforce the stack and to carry scale marking. The width of the face plate is about equal to the length of the short plates 55. Its lower end 64 is bent under the stack and bored to admit the bolts 60. The free ends or ears 57 of the long plates thus extend laterally out beyond the face plate in staggered order.

The upper end 66 of the face plate extends upwardly beyond the stack, lying in an appropriate recess 67 formed in the front of the block 29.

My accessory is completed by a sheet metal member 70 bent generally to conform to the convergent side surfaces 34 and front face of the fork portion 26. Screws 72 secure the member to the block 29, and a screw 73 extends through the front face of the member, the upper end of the face plate 62 and into the block to anchor the face plate. The sheet metal member has vertically oriented, laterally extending rolls 74 therein at its angles of bend to provide ribs by which the accessory may be seized and pulled off or mounted to the gauge. Legs 76 extend downwardly from the rear edges of the member portions lying against the convergent block surfaces 34 and are formed and folded to provide clips 78 extending rearwardly under the arms 40 of the fork portion 26 and suitably spaced under the bottom points 52 of the ball bearings 50 to accommodate resiliently a ring 22 of the gauge bar 20. For greater handling ease, the clip ends are slit to define a strap 77, the strap and strap edges bent oppositely, and bearings 79 pressed into the receptacles thus formed. The clips 78 urge the fork portion 26 of the accessory down firmly against the top precision surface of the ring and bring the ball bearings 50 into firm engagement therewith. Since highly accurate bearings both as to diameter may be readily obtained relatively inexpensively and since these bearings are contained on one side against the true bottom surface 36 of the block 29, they will establish a plane accurately spaced and oriented with respect to the true surface of the ring 22 to which my accessory is mounted.

Since the bottoms 52 of the balls 50 occupy exactly the plane of the reference surface of the ring 22, the boss 59 will have a depth exactly equal to the diameter of the balls 50. Thus the surface 58 will lie in the same plane as the reference surface of the ring. The stack of plates 55, 56 will start from the surface 58 with a long plate 56a, the top surface of which will occupy the ring surface plane. The under side of the projecting plate end will give a reference surface of Cadillac gauge reading minus .05 inch. A short plate is immediately below plate 56a and a second long plate 56b below it, the end of plate 56b projecting from the stack oppositely to plate 56a. The top surface of plate 56b is gauge reading minus .10 inch; the bottom surface is gauge reading minus .15 inch. As illustrated, the stack is carried down in this fashion for 1.6 inches. The Cadillac rings are one inch apart.

It will be appreciated that while the consecutive ears or plate ends provide reference surfaces .1 inch apart, adjacent ears on each side of the stack or column are spaced apart .3 inch for easy accessibility to the finger of a dial indicator.

The operation and use of my device will be readily apparent from the foregoing description. Assuming that an engineering drawing calls for a height of 3.8750 inches, the micrometer will be set to a reading of .0750. The device of my invention will be clipped to the fifth ring 22 from the bottom on the gauge bar 20 and the dial indicator then adjusted to the top surface of the ear marked .8 inch. If the next measurement called for is 3.1250, my accessory will be removed from the ring, the micrometer turned from .0750 to .0250, the accessory attached again to the same ring and the dial indicator then adjusted to the top surface of the ear marked .1 inch. With the basic gauge, thirty full revolutions of the micrometer would be required to effect this change. With the device of my invention, only two revolutions are required.

It will be understood that I have described here an embodiment only of my innvention. Other ways of attaching the accessory to the reference surfaces of the basic gauge will undoubtedly suggest themselves. Other alternatives in the structure and practice of my invention will equally undoubtedly suggest themselves and I therefore desire that my invention be regarded as being limited only as set forth in the following claims.

I claim:
1. An accessory for a reference height gauge of the type having a base, a bar having a plurality of rings thereabout equally spaced along said bar, said rings providing reference surfaces perpendicular to the axis of said bar, and a micrometer for moving said bar up and down, comprising a U-shaped member adapted to receive said bar between two of said rings, said member having a flat bottom surface adapted to oppose the reference surface of the ring below said member, a plurality of identical ball bearings, means retaining said bearings against said bottom surface with the bottom ends thereof exposed, said ends being engageable on the reference surface of the ring below, clip arms mounted to said member and adapted to engage the under side of said ring below to retain said bearing ends against said reference surface, a columnar scale extending downwardly from the bottom surface of the base of said member adapted to be parallel to the axis of said bar when said U-shaped member is mounted to one of said rings, said scale having a plurality of equally spaced ears extending therefrom in staggered relation in two columns, said ears providing top reference surfaces subdividing the distance between ring reference surfaces evenly.

2. An accessory for a reference height gauge of the type having a base, a bar having a plurality of reference surfaces spaced a unit of measurement apart therealong at right angles to the axis thereof, and a micrometer for moving said bar up and down; comprising a member mountable to said bar in a predetermined accurate relation to one of said reference surfaces, and a columnar scale on said member to be parallel to said bar when said member is mounted to said bar, said scale comprising a stack of alternate short and long plates of equal thickness, the ends of the long plates projecting alternately to the left and to the right of said stack, said projecting ends providing reference surfaces subdividing said units evenly.

3. An accessory for a reference height gauge of the type having a base, a bar having a plurality of rings thereabout equally spaced along said bar, said rings providing reference surfaces perpendicular to the axis of said bar, and a micrometer for moving said bar up and down; comprising a U-shaped member adapted to receive said bar between two of said rings, said member having a flat bottom surface adapted to oppose the reference surface of the ring below said member, a clip mounted to said member and adapted to engage the underside of said ring below to secure said member to said ring in a predetermined angular and positional relation, a columnar scale extending downwardly from the bottom surface of the base of said member adapted to be parallel to the axis of said bar when said U-shaped member is mounted to one of said rings, said scale having a plurality of equally spaced ears extending therefrom in staggered relation in two columns, said ears providing top reference surfaces subdividing the distance between ring reference surfaces equally.

References Cited by the Examiner
UNITED STATES PATENTS
2,536,401  1/1951  Victor _____ 33—168
2,713,208  7/1955  Bizzoco _____ 33—170

FOREIGN PATENTS
853,684  11/1960  Great Britain.

LEONARD FORMAN, *Primary Examiner.*

ISAAC LISANN, *Examiner.*

F. H. THOMSON, *Assistant Examiner.*